United States Patent [19]

Toyoda et al.

[11] Patent Number: 4,840,240
[45] Date of Patent: Jun. 20, 1989

[54] WEIGHING AND PACKING DEVICE

[75] Inventors: Yoshiharu Toyoda, Akashi; Yoshitaka Mikata, Himeji; Shoji Yamano, Akashi, all of Japan

[73] Assignee: Yamato Scale Company, Limited, Japan

[21] Appl. No.: 147,785

[22] Filed: Jan. 25, 1988

[30] Foreign Application Priority Data

Jan. 26, 1987 [JP] Japan .................. 62-17096

[51] Int. Cl.$^4$ ............................................. G01G 13/00
[52] U.S. Cl. ........................................ 177/25.18; 177/1
[58] Field of Search ...................... 177/25.18, 1

[56] References Cited

U.S. PATENT DOCUMENTS

| | | | |
|---|---|---|---|
| 4,558,774 | 12/1985 | Mikami | 177/25.18 |
| 4,570,727 | 2/1986 | Ueda | 177/25.18 |
| 4,630,695 | 12/1986 | Connors et al. | 177/25.18 |
| 4,657,129 | 4/1987 | Mikami | 177/25.18 |
| 4,676,325 | 6/1987 | Yamano et al. | 177/25.18 |
| 4,706,766 | 11/1987 | Yamano et al. | 177/25.18 |
| 4,709,769 | 12/1987 | Yamano et al. | 177/25.18 |

*Primary Examiner*—George H. Miller, Jr.
*Attorney, Agent, or Firm*—Senniger, Powers, Leavitt and Roedel

[57] ABSTRACT

A weighing and packing device for successively producing packages of product each of which is conformable with a predetermined weight condition. The device comprises a pair of combination weighing and packing machines mounted on a common frame as a single unit. Each machine includes a combination weigher and an associated packer which are mechanically interlocked so that the batches of product successively delivered from the combination weigher are packed by the packer in tubular bags fabricated successively from a sheet material. The combination weighers of both machines have their own control units electronically interlocked so that both machines can operate in mutually synchronized or nonsynchronized fashion with or without time lag.

18 Claims, 11 Drawing Sheets

```
          ┌─114
         10         POTATOCHIPS
     SET WT.    100.0g    WT.
              1 2 3 4 5 6 7   1̄ 2̄ 3̄ 4̄ 5̄ 6̄ 7̄    L A H

MEAN WT.            NUMBER OF UNITS
     SPEED               AMPLITUDE    40
     BAG LENGTH  250 mm  RPM          65
     TOTAL DELIVERIES

AUTO  UNLOAD  ZERO  MANUAL  STATISTIC  PRINT  SETTING
```

FIG. 12

```
     10                  POTATOCHIPS
     SET WT.    100.0 g    WT.        0 g
              1 2 3 4 5 6 7   1̄ 2̄ 3̄ 4̄ 5̄ 6̄ 7̄    L A H

114
     WEIGHER  PRODUCT      DATE     [SYNC]
```

FIG. 13

WEIGHING AND PACKING DEVICE

BACKGROUND OF INVENTION

This invention relates to a combination weighing and packing device used for successively weighing out batches of product, each having a weight equal or close to a predetermined value, and sequentially packing them in bags or the like. More particularly, this invention relates to twin-type combination weighing and packing device.

A typical example of "twin-type" combination weighing device is disclosed in the Japanese patent opening gazette No. 60-161530. This device includes a pair of conventional combination weighers having a common dispersion feeder and individual delivery ports. The aforementioned "twin-type" combination weighing and packing device is composed of such twin-type combination weighing device and a pair of packing machines coupled respectively to the above-mentioned delivery ports for packing the batches of product delivered from the respective combination weighers. A suitable example of such packing machine is disclosed in U.S. Pat. No. 4,288,965. Such twin-type combination weighing and packing device is advantageous in that it occupies a much smaller installation area as compared with two discrete combination weighing and packing machines having comparable power of production. However, the pair of combination weighing and packing machines of this device are functionally independent of each other and it is difficult to operate both machines in a predetermined timing condition such as synchronized mode which is often desired, for example, when the packages are to be delivered from both machines onto a common belt conveyer, in order, at predetermined intervals.

SUMMARY OF INVENTION

Accordingly, an object of this invention is to provide an improved twin-type combination weighing and packing device which selectively operates in synchronized and nonsynchronized modes which enables an operator to freely specify the phase or timing relationship between the operations of both machines.

This object can be attained in accordance with this invention which provides a weighing and packing device comprising first and second combination weighers, each adapted to deliver batches of product, each batch having a total weight equal or close to a target weight preset as one of operating conditions of each aid weigher first and second packers pack the batches of product delivered from the first and second combination weighers, respectively control means controls the operations of the first and second combination weighers and the first and second packers. At least one operation display means coupled to the control means supplies the operating conditions of the first and second combination weighers and the first and second packers and displays the operation data of the first and second combination weighers and the first and second packers. The control means is adapted to operate the first and second combination weighers in a first mode in which the weighers operate synchronously to deliver the batches of product to their respective packers at rates which are a function of each other and in a second mode in which the weighers deliver the batches of product to their respective packers at rates which are independent of each other. The control means selects one of the first and second modes of operation in accordance with the operating conditions supplied from the operation display means.

These and other objects and features of this invention will be decribed in more detail below with reference to the accompanying drawings.

BRIEF DESCRIPTION OF DRAWINGS

In the drawings:

FIGS. 12 to 15 are diagrams representing exemplary operation patterns displayed on the display screen of the operation display means as shown in FIG. 10;

Throughout the drawings, the same reference numerals are given to corresponding structural components.

DESCRIPTION OF PREFERRED EMBODIMENTS

Figure 1:
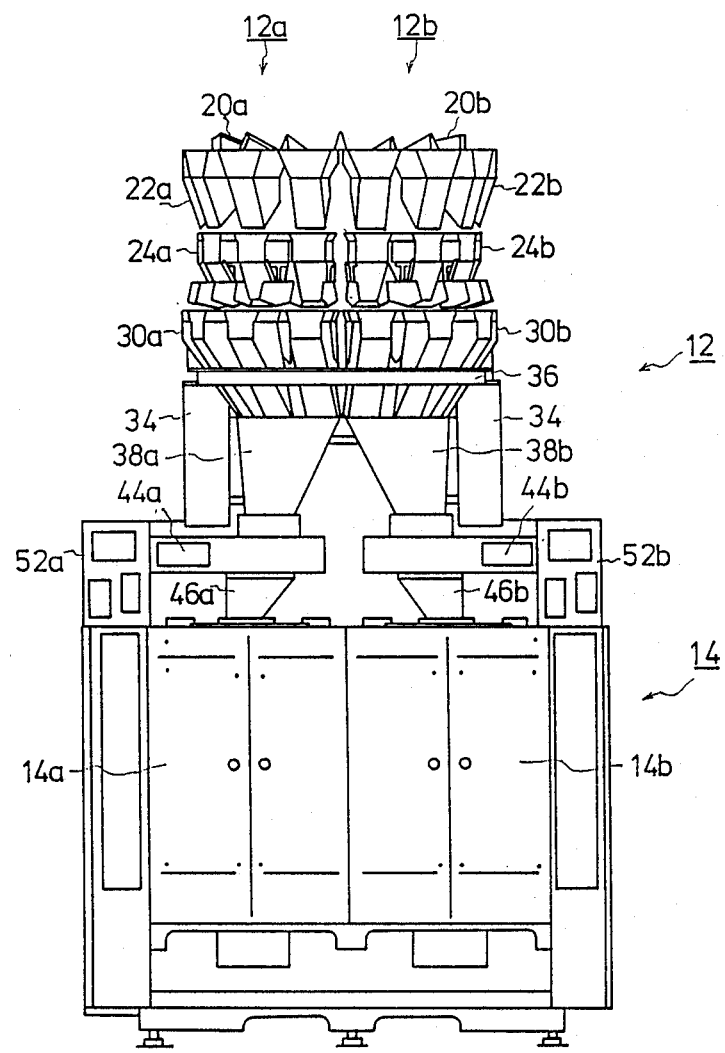
FIG. 1 is a front view representing an embodiment of the weighing and packing device according to this invention.
Figure 2:
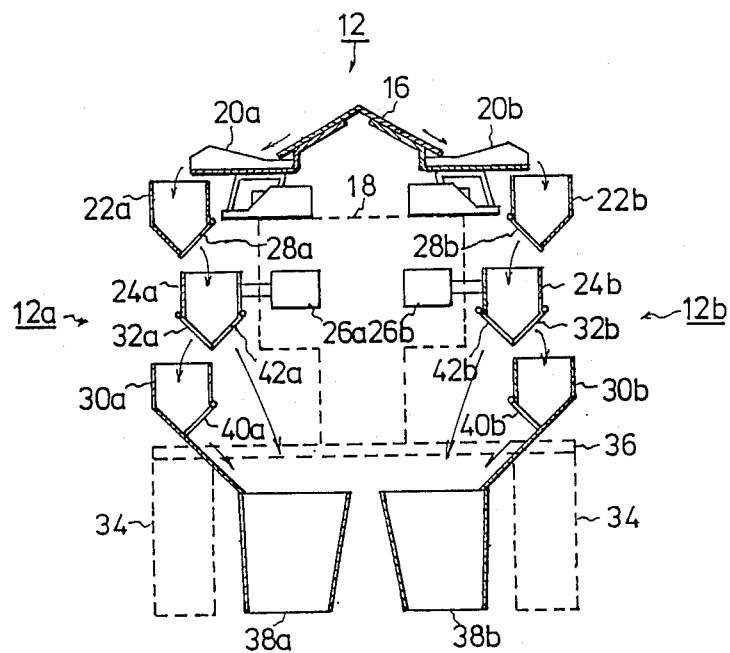
FIG. 2 is a schematic front view representing, partly in section and partly in phantom, a mechanical configuration of a part of the embodiment of FIG. 1.

Referring first to FIGS. 1 and 2, a preferred embodiment of the inventive weighing and packing device as shown includes a united combination weigher section 12 and a united packer section 14. The united combination weigher section 12 includes a pair of combination weighers 12a and 12b and a common dispersion feeder 16 for feeding product to both combination weighers 12a and 12b. As shown in FIG. 2, the dispersion feeder 16 is composed of a conical cover 16 over the slanting inner end portions of electromagnetic linear feeders 20a and 20b which are arranged radially on a support frame 18 shown in phantom. Such a dispersion feeder is disclosed, for example, in U.S. Pat. No. 4,600,096. In this embodiment, seven electromagnetic linear feeders 20a are associated with the combination weigher 12a and seven electromagnetic linear feeders 20b are associated with the combination weigher 12b.

Seven feed hoppers 22a and seven feed hoppers 22b are respectively disposed under the distal or outer ends of the electromagnetic linear feeders 20a and 20b. Though not shown in the drawing, these feed hoppers 22a and 22b are supported by support frame 18. Seven weigh hoppers 24a and seven weigh hoppers 24b are respectively disposed under the feed hoppers 22a and 22b and coupled to respective weighing units 26a and 26b which are composed of load cells or the likes supported also by the support frame 18. Each weigh hopper 24a or 24b is adapted to receive product from the overhead feed hopper 22a or 22b when its discharge gate 28a or 28b opens and each weighing unit 26a or 26b is adapted to provide a weight signal indicative of the weight of product fed into the corresponding weigh hopper 24a or 24b.

Each weigh hopper 24a or 24b has an outer discharge gate 32a or 32b and an inner discharge gate 42a or 42b adapted to discharge the product respectively outside and inside of the circle of arrangement of the weigh hoppers. Seven auxiliary hoppers 30a and seven auxiliary hoppers 30b are respectively disposed under the outer discharge gates 32a and 32b of the weigh hoppers 24a and 24b, in order to receive the product discharged from the corresponding outer discharge gates. These auxiliary hoppers 30a and 30b are supported on a support plate 36 which is in turn supported by another support frame 34 having a U-shaped plan contour. The aforementioned support frame 18 is also supported on the support plate 36.

A pair of collection chutes 38a and 38b are also supported by the support frame 34. The collection chute 38a is adapted to collect the product discharged from discharge gates 40a of the auxiliary hoppers 30a and/or the product discharged from the inner discharge gates 42a of the weigh hoppers 24a for delivery to the underlying packer 14a. Collection chute 38b is adapted to collect the product discharged from discharge gates 40b of the auxiliary hoppers 30b and/or the product discharged from the inner discharge gates 42b of the weigh hoppers 24b for delivery to the underlying packer 14b.

The above-mentioned electromagnetic linear feeders 20a, feed hoppers 22a, weigh hoppers 24a, weighing units 26a, auxiliary hoppers 30a and collection chute 38a are included in the combination weigher 12a and the above-mentioned electromagnetic linear feeders 20b, feed hoppers 22b, weigh hoppers 24b, weighing units 26b, auxiliary hoppers 30b and collection chute 38b are included in the combination weigher 12b. Thus, the most components of both combination weighers 12a and 12b are mounted on a common suppor base including the above-mentioned members 18, 34 and 36, so that both the combination weighers 12a and 12b are united and supported on the united packer section 14. Though not shown in the drawings, the discharge gates 28, 32, 40 and 42 are opened and closed by individual air-cylinders which are also supported by the frame 18.

The united packer section 14 includes a pair of "form-fill-seal type" packers 14a and 14b enclosed in a common housing. Each of the packers 14a and 14b is adapted to pack the collected batches of product delivered from each combination weigher in a bag which is successively formed from a sheel material. Such packer is described in the aforementioned U.S. Pat. No. 4,288,965 and no further description will be made thereon.

The collection chutes 38a and 38b of the combination weighers 12a and 12b are connected to the packers 14a and 14b through connection tubes 46a and 46b, respectively, and metal detectors 44a and 44b are attached to the connection tubes 46a and 46b, respectively, for detecting the batches of product containing metallic admixture to provide an alarm signal which is used for removing those packages containing such undesirable product batches at the outlets of the packers 14a and 14b. The metal detectors 44a and 44b will not be described further since they have no direct connection to this invention.

Figure 3:
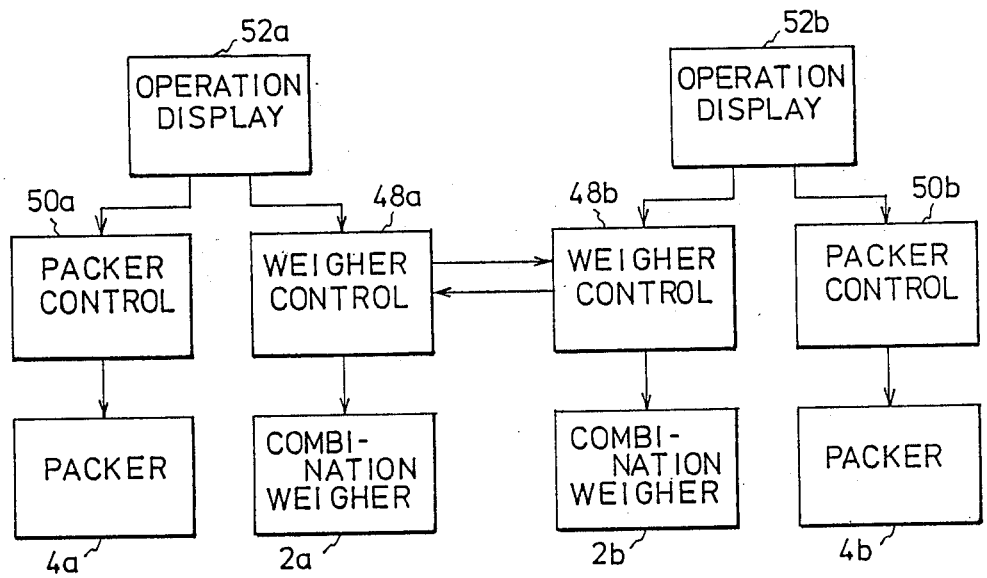
FIG. 3 is a block diagram representing an electrical configuration of the embodiment of FIG. 1.

The packer section 14 also includes weigher control units 48a and 48b for controlling the combination weighers 12a and 12b, respectively, and packer control units 50a and 50b for controlling the packers 14a and 14b, respectively, as shown in FIG. 3. Moreover, operation display units 52a and 52b are provided for supplying various operating conditions to the weigher control units 48a and 48b and to the packer control units 50a and 50b and for displaying operation data provided from these control units.

Figure 4:
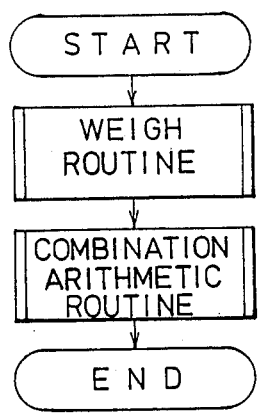
FIG. 4 is a schematic flow chart representing a part of the operation of combination weigher of the embodiment of FIG. 1.
Figure 5:
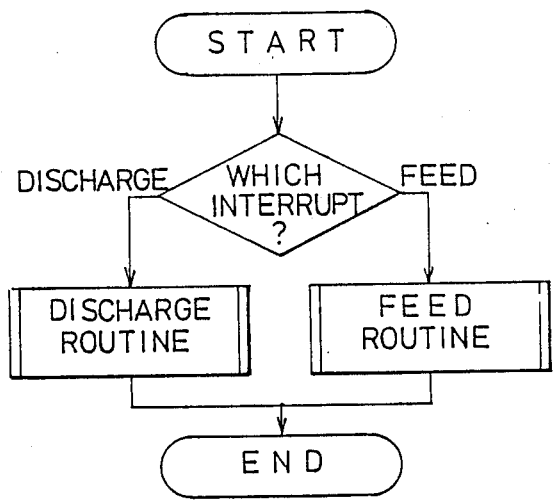
FIG. 5 is a schematic flow chart representing the remainder of the operation of the combination weigher of the same embodiment.

The weigher control unit 48a includes, for example, two central processing units (CPU), one of which is adapted to provide control commands for transferring weight values from memory locations corresponding to those weigh hoppers 24a which are discharging their contents to the corresponding auxiliary hoppers 30a to memory locations corresponding to these auxiliary hoppers 30a, and for storing weight values indicated by the signals from those weighing units 26a coupled to reloaded weigh hoppers 24a in memory locations corresponding to these weigh hoppers 24a, in a weigh routine as shown in FIG. 4, provided that a feed routine as described later is running. The weight values stored in these memories are combined in the next combination arithmetic routine to select those weigh hoppers 24a and/or auxiliary hoppers 30a containing batches of product whose total weight is equal or close to a preset target weight. The other CPU is adapted to provide control commands for opening discharge gates 42a and/or 40a of those weigh hoppers 24a and/or auxiliary hoppers 30a selected by the former CPU in a discharge routine as shown in FIG. 5 to discharge the above-mentioned batches of product into the collection chute 38a, opening discharge gates 28a of those feed hoppers 22a corresponding to the emptied weigh hoppers 24a in the feed routine to reload them and driving those electromagnetic linear feeders 20a corresponding to the emptied feed hoppers 22a to reload them. Then, the dispersion feeder 16 is also actuated accordingly to feed product to these electromagnetic linear feeders 20a. It also reloads the emptied auxiliary hoppers 30a by opening the discharge gates 32a of the overhead weigh hoppers 24a if they have been loaded, and reloads the emptied weigh hoppers 24a in the same fashion as above-mentioned.

The weigher control unit 48b also includes two CPUs adapted to provide control commands similar to those from the CPUs of the weigher control unit 48a for controlling similar operations of the weigher 12b.

The CPUs of the weigher control units 48a and 48b, which are adapted to execute the feed and discharge routines, sequentially execute the steps of the feed routine in accordance with interrupt signals repeatedly produced in short periods (cycles) by a clock generator (not shown) to command start of the feed routine and also execute the steps of the discharge routine in accordance with separate interrupt signals repeatedly produced from the clock generator at different time points from the former interrupt signals.

The weigher control units 48a and 48b can control the operation of combination weighers 12a and 12b, respectively, not only in nonsynchronized mode in which the combination weighers 12a and 12b have independent cycles, i.e., each has a different period T1 of delivery of the product therefrom, but also in synchronized mode in which the weighers have cycles which are a function of each other, e.g., the same period T1. The nonsynchronized mode of operation is suitable when both combination weighers 12a and 12b are operating differently, for example, when the target weight and the number of deliveries per unit time, (cycles) resulting in different processing speeds. The synchronized mode of operation is suitable when both weighers have the same target weight and the number of deliveries per unit time cycles resulting in the same processing speed. In the synchronized mode of operation, it is also possible to control the operation so as to deliver product from both weigher 12a and 12b not only at the same time, but also at a predetermined time lag T2.

Figure 6:
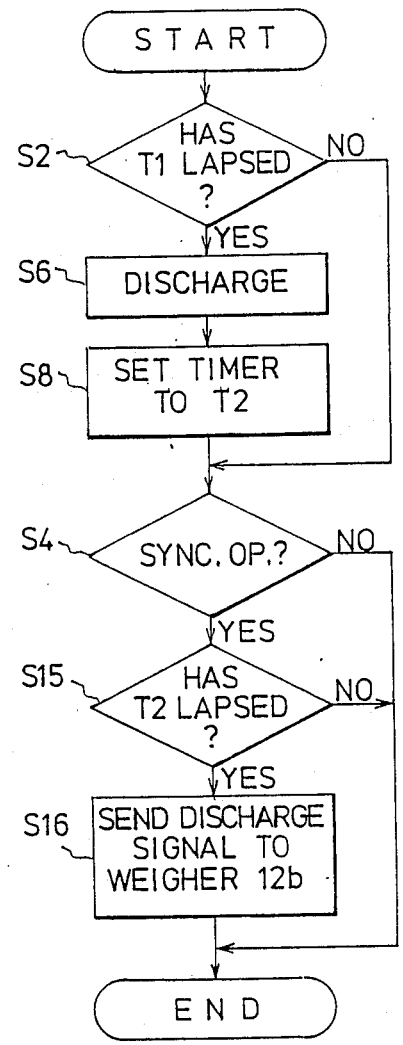
FIG. 6 is a detailed flow chart of a discharge routine of one of the combination weighers of the embodiment of FIG. 1.

Assuming now the combination weigher 12a as "master" and the combination weigher 12b as "slave", FIG. 6 shows a flow chart of the discharge routine for the weigher 12a to be operated as above. The description will be made first in connection with the synchronized mode of operation. In response to interrupt signals for commanding the start of the discharge routine, step S2 determines whether the cycle of operation has been completed, i.e., whether the predetermined period of delivery T1 has lapsed after the preceding delivery. If not step S4 determines whether the operation is in synchronized mode or not. If the answer is NO, this discharge routine is ended. In he discharge routine, only these steps S2 and S4 are repeated several times since the period of the interrupt signals is substantially less than the delivery period T1. In the meantime, however, the time T1 lapses and the answer in step S2 becomes YES. Then, batches of product are discharged from those weigh hoppers 24a and/or auxiliary hoppers 30a which are specified by the CPU for excuting the weigh and combination arithmetic routines (step S6), a predetermined value of the time lag T2 is set in a timer (step S8) and the routine is ended. Thus, the combination weigher 12a delivers product at time intervals of T1.

Figure 7:
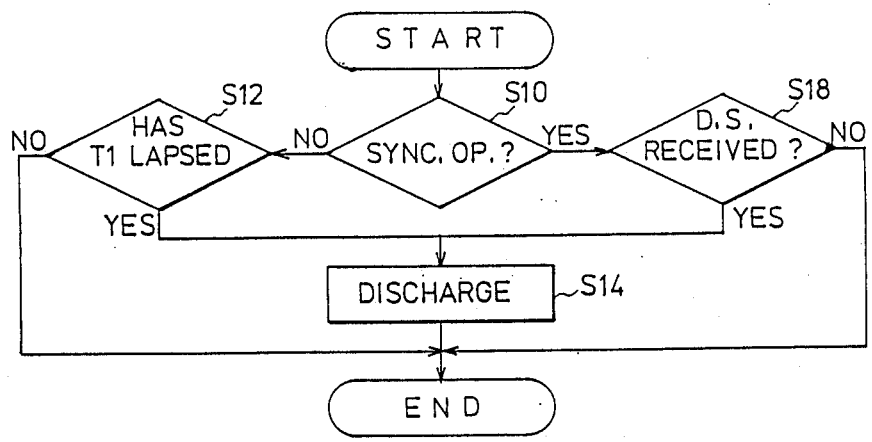
FIG. 7 is a detailed flow chart of the discharge routine of the other combination weigher of the same embodiment.

In the combination weigher 12b, as shown in the flow chart of FIG. 7, Step S10 determines in response to every interrupt signal whether the operation is in synchronized mode or not. In the case of nonsynchronized mode, step S12 determines whether the predetermined period of delivery T1 for the weigher 12b has lapsed after the preceding delivery. It should be noted that the value of T1 for the weigher 12b differs from the aforementioned value T1 for the weigher 12a in the nonsynchronized mode of operation. If T1 has not lapsed, this discharge routine is ended. Eventually, as in the case of weigher 12a, the answer in step S12 becomes YES and the batches of product are discharged from the selected weigh hoppers 24b and/or auxiliary hoppers 30b (step S14), thereby ending the routine. Thus, the combination weigher 12b also delivers product at time interval T1 differing in value from the aforementioned T1 for the weigher 12a.

If the value of T1 for either weigher 12a or 12b is set to infinity, no product is delivered from this weigher, thereby enabling operation of only one combination weigher.

In case of the synchronized mode of operation, referring again to FIG. 6, the combination weigher 12a repeats steps S2 and S4 in response to each interrupt signal, as in the case of nonsynchronized mode, before the lapse of time T1. Upon the completion of a cycle, i.e., the lapse of time T1, however, it deliver batches of product (step S6) and the time lag T2 is set in the timer (step S8). Next, the answer of step S4 is YES and step S15 determines whether the time T2 has lapsed or not. If NO, the discharge routine is ended. Thereafter, only steps S2, S4 and S15 are repeated in response to every interrupt signal until the time T2 lapses. Eventually, the answer of step S15 becomes YES and a discharge signal is sent to the combination weigher 12b (step S16).

In the discharge routine for the weigher 12b shown in FIG. 7, step 18 determines whether the discharge signal has been received or not, in response to every interrupt signal, since the answer in step S10 is always YES. If it is not yet received, the discharge routine is ended. Only steps S10 and S18 are repeated in response to the interrupt signals in this routine before reception of the discharge signal but, when it is received, batches of product are discharged from the selected weigh hoppers 24b and/or auxiliary hoppers 30b (step S14) and the routine is ended.

If the time lag T2 is set to zero in this synchronized mode of operation, both combination weigher 12a and 12b deliver the product at the same time and, if it is set to T1/2, they deliver the product alternately at intervals of T1/2.

Since each of the combination weighers 12a and 12b includes separate CPUs respectively provided for execution of the feed and discharge routines and for execution of the weigh and combination arithmetic routines, the load upon each CPU is relatively small. More specifically, when on CPU of the weigher 12a is in step S6 of the discharge routine, the other CPU has completed the combination arithmetic routine and those weigh hoppers 24a and/or auxiliary hoppers 30a to be unloaded have been selected. Similarly, when one CPU of the weigher 12b is in S14, the other CPU has completed the combination arithmetic routine and those weigh hoppers 24b and/or auxiliary hoppers 30b to be unloaded have been selected. While, in the above description, the weigher 12a is assumed as "master" and unloaded first in case of synchronized mode, it may be the "slave" and unloaded later than the weigher 12b.

Figure 8:
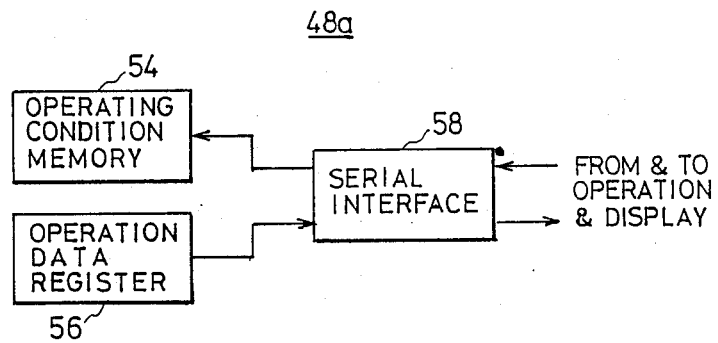
FIG. 8 is a block diagram representing an essential part of combination weigher control means of the embodiment of FIG. 1.

As shown in FIG. 8, various operating conditions for the combination weigher 12a such as the above-mentioned mode of operation and target weight are supplied from the operation display unit of FIG. 3 to an operating condition memory 54 in the weigher control unit 48a through a serial interface 58, various operating conditions for the packer 14a such as the bag length for the packages delivered therefrom are also supplied from the operation display unit 52a to an operating condition memory (not shown) in the packer control unit 50a through a similar serial interface (not shown). The operating conditions for the combination weigher 12b and the packer 14b are supplied from the operation display unit 52b to operating condition memories in the wiegher control unit 48b and packer control unit 50b in the same fashion.

On the other hand, the operation data of the combination weigher 12a including total weight data indicative of the total weight of product delivered from the weigher 12a and number-of-unit data indicative of the number of hoppers which have discharged the delivered product are supplied from an operation data register 56 in the weigher control unit 48a to the operation display unit 52a through the serial interface 58 as shown in FIG. 8. The operation data of the packer 14a including total delivery data indicative of the number of packages delivered therefrom per unit time are supplied from an operation data register (not shown) in the packer control unit 50a to the operation display unit 52a through a serial interface (not shown). Similarly, the operation data of the combination weigher 12b and the packer 14b are also supplied from operation data registers in the weigher control unit 48b and packer control unit 50b to the operation didplay unit 52b through a serial interface.

Figure 9:
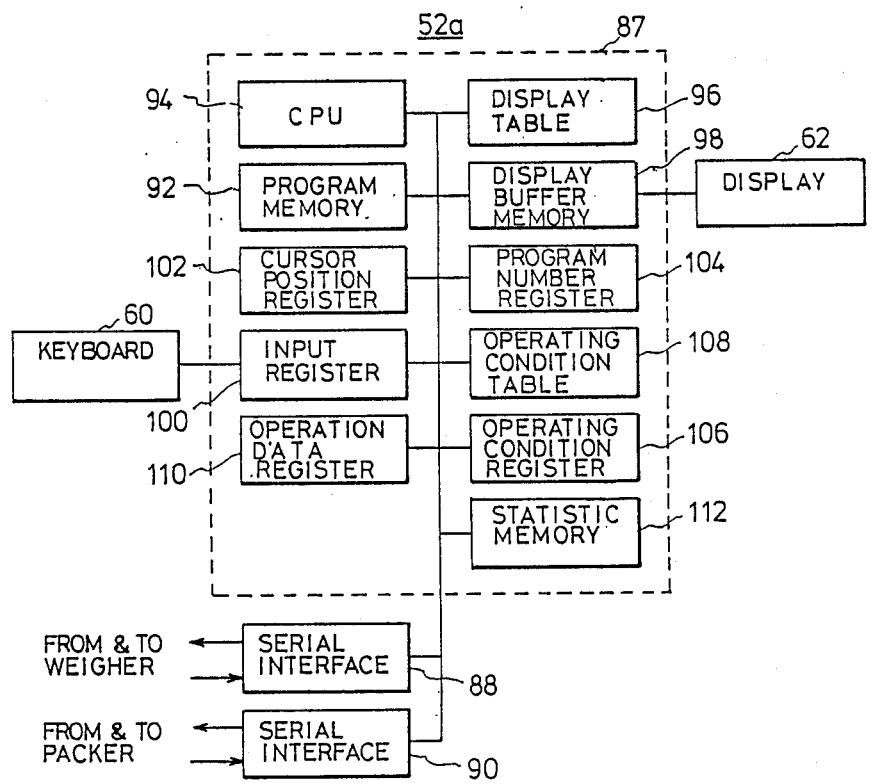
FIG. 9 is a block diagram representing an electrical configuration of operation display means of the embodiment of FIG. 1.
Figure 10:
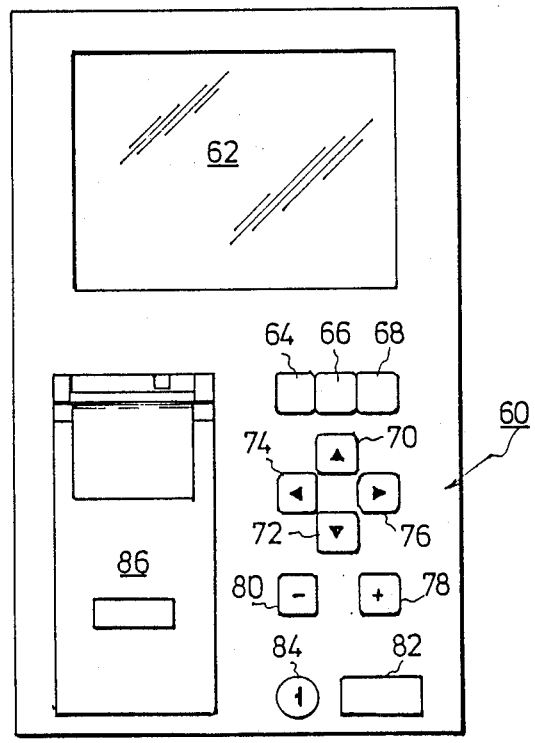
FIG. 10 is a front view representing an external appearance of the operation display means of the same embodiment.

As the operation display units 52a and 52b have the same structure, the description will be made regarding the operation display unit 52 only. As shown in FIG. 9, the operation display unit 52a is provided with a keyboard 60 and a display screen 62. As shown in FIG. 10, the keyboard 60 includes a run key 64, a return key 66 and a print key 68 and further includes cursor keys 70, 72, 74 and 76 for moving a cursor displayed on the display screen 62 in both vertical and horizontal directions and plus and minus keys 78 and 80 for increasing and decreasing a numerical value selected by the cursor on the display screen 62, keyboard 60 also includes a change-over switch 48 for switching between weigher and packer and a key switch 84 for selectively controlling the operation range to prevent erroneous operation by an unskilled operator. The display screen 62 may be of a cathode-ray tube. In the drawing, 86 denotes a printing device for printing the displayed image on the screen 62 by pushing the print key 68. The keyboard 60 and display screen 62 of the operation display unit 52a are disposed on one side of the front face of the united packer section 14 of FIG. 1 and, similarly, those of the operation display unit 52b are disposed on the other side of the same face.

In addition, the operation display unit 52a includes a control unit 87 which may be composed of a microcomputer. The control unit 87 is also connected through serial interfaces 88 and 90 to the weigher control unit 48a and packer control unit 50a. The control unit 87 includes a CPU 94 adapted for executing various functions such as setting, displaying and changing operating conditions, controlling and monitoring automatic and manual operations of weigher 12a and packer 14a and statistically analyzing operation data in accordance with programs preset in a progfram memory 92. A display table memory 96 stores data patterns to be displayed on the display screen 62 through a display buffer memory 98. The display screen 62 displays a cursor which moves in response to a control signal supplied from the cursor keys 70 to 76 on the keyboard 60 through an input register 100, and a cursor position register 102 traces the moving cursor to store the current cursor position. A program number register 104 stores some identification numbers of weigher and packer programs suitable for respective product to be handled by the weigher 12a and the packer 14a, and an operating condition register 106 stores some operating conditions, such as target weight, vibration amplitude of the electromagnetic linear feeders 20a, packing bag length and driving speed, corresponding to the program numbers stored in the program number register 104. The operating conditions corresponding to each program number are read out from the program number register 104 and operating condition register 106 and stored temporarily in a predetermined pattern in an operating condition table memory 108 for display with the content of the display table memory 96. An operation data register 110 temporarily stores the operation data serially transferred from the operation data register 56 of the weigher control unit 48a and from the operation data register of the packer control unit 50a, and displays them successively in real time on the display screen 62. Some of these data are stored in a statistic memory 112 for optional statistic analysis.

Figure 11A:
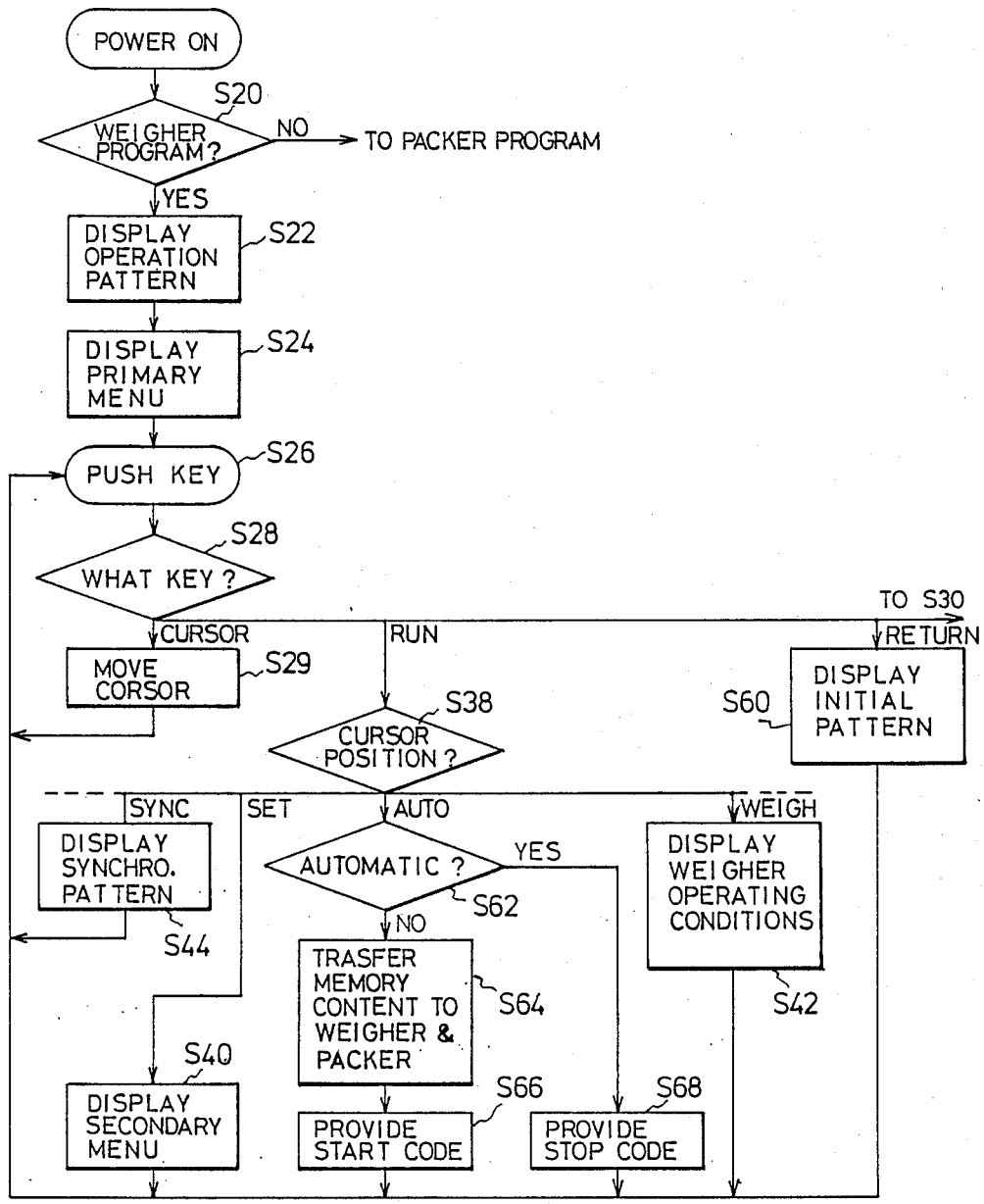
FIGS. 11A and 11B form a flow chart representing the operation of operation display means of the same embodiment.
Figure 11B:
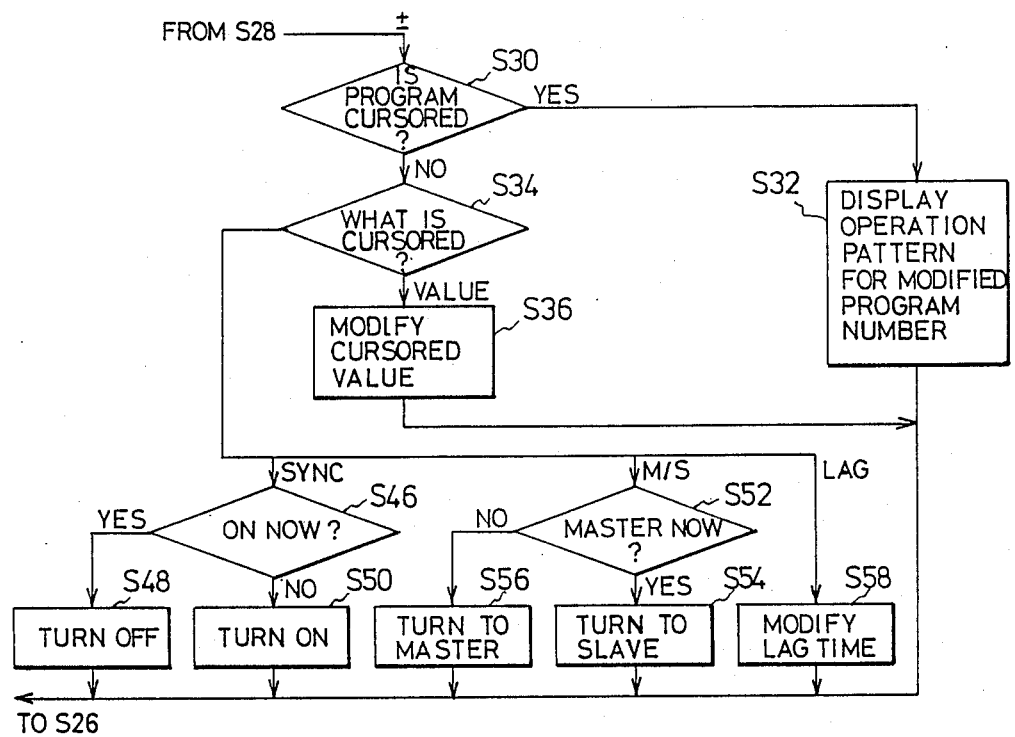
Figure 16:
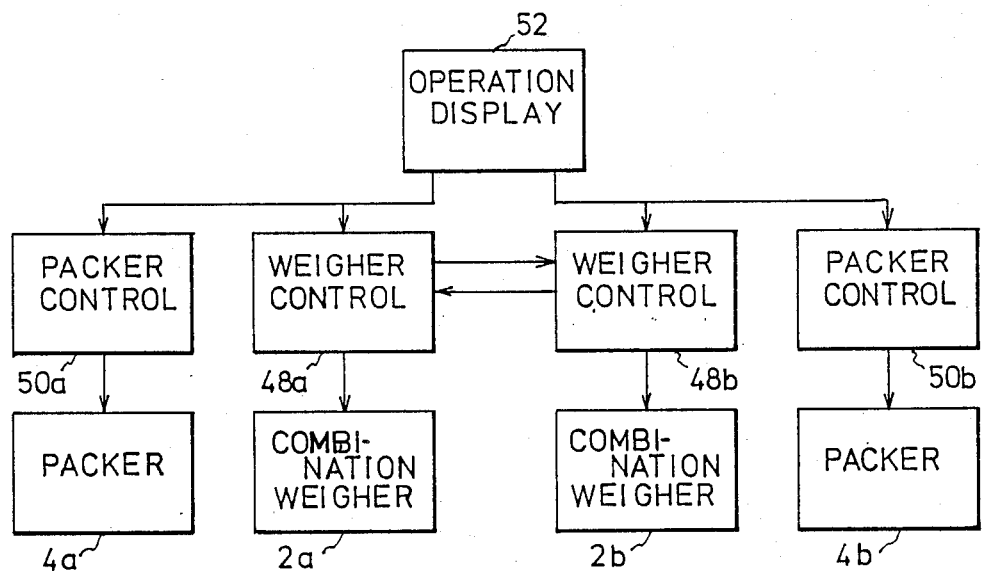
FIG. 16 is a block diagram representing an electrical configuration of another embodiment of this invention.

Now, operation of the operation display unit 52a with reference to the flow chart of FIGS. 11A, and 11B and the display patterns of FIGS. 12 to 15 will be described. When the key switch is adequately set and the power is put on, step S20 first determines whether the weigher program is to be used or not. If the switch 84 has been set to select the program for weigher 12a, an operation pattern and a primary operating condition menu for the weigher 12a are read out from the display table memory 96, program number register 104 and operating condition register 106 of the control unit 52a and displayed on the display screen 62 (steps S22 and S24). The primary menu displayed on the screen 62 includes "AUTO", "UNLOAD", "ZERO", "MANUAL", "STATISTIC", "PRINT" and "SETTING" displayed at the bottom as shown in FIG. 12. These items mean automatic operation, unloading of all hoppers, zero correction, manual operation, statistic analysis, printing operation and parameter setting operation, respectively. In other words, the word "menu" means a list of essential modes of operation.

It is assumed that the display screen 62 now displays an operation pattern, as shown in FIG. 12, including "POTATOCHIPS" as the name of product, "10" as the program number, "100.0 g" as the target weight, "250 mm" as the bag length, "250 rpm" as the driving speed and "40" as the vibration amplitude of feeders 20a. This display includes essential items and values of the operating condition of program number "10".

With reference to the displayed operating condition, the operator judges whether it is suitable or not. If it is deemed unsuitable, he pushes the cursor keys 70 to 76 (step S26). Then, step S28 determines what key is pushed. As the cursor keys are now pushed, a displayed cursor 114 moves in response to actuation of the cursor keys 70 to 76 (step S29). By this operation, the cursor 114 may be moved onto the displayed program number "10" as shown in FIG. 12. If the plus key 78 or minus key 80 is pushed in this condition (step S26), step S30 determines whether the program number is cursored or not (step S30). As the answer is YES in this case, the displayed program number "10" is modified up and down with the keys 78 and 80 and the displayed operating condition is also modified accordingly (step S32). Thus, the operator can obtain a desired program number and corresponding operating pattern on the screen 62 by repeating this operation.

If there is a value desired to be modified in the displayed resultant operating condition, the cursor 114 is moved onto the value to be modified by pushing the cursor keys 70 to 76 as described above and, then, the plus or minus key 78 or 80 is pushed to enter step S30. As the answer is NO in this case step S34 determines what is now cursored. As a value is now cursored, the cursored value is modified by the key 78 or 80 and the modified value is displayed on the screen 62 (step 36). Thus, the operator can obtain a satisfatory value in this manner.

When it is desired to modify any item of operating condition other than those displayed on the screen, the cursor 114 is moved to the position of "SETTING" and the run key 64 is pushed. Then step S3B determines where the cursor is positioned and the answer is obtained as "SETTING". Therefore, a secondary menu including "WEIGHER", "PRODUCT", "DATE" and "SYNC" is displayed as shown at the bottom of FIG. 13 (step S40). These items in the secondary menu mean to set operating conditions of the combination weigher 12a, to register the name of product, to set date printing condition in automatic operation and to select synchronized or nonsynchronized mode of operation, respectively.

If it is desired to change the preset operating condition, the cursor 114 is moved to "WEIGHER" by pushing the cursor keys 70 to 76 (steps S26, S28 and S29) and then the run key 64 is pushed, thereby displaying various operating conditions for weigher other than the above-mentioned (step S42). Then, the cursor 114 is further moved to any value to be modified and the plus and minus keys 78 and 80 are pushed (step S30, S34 and S36) in the same fashion as above. This will result in a desired value.

Figure 14:
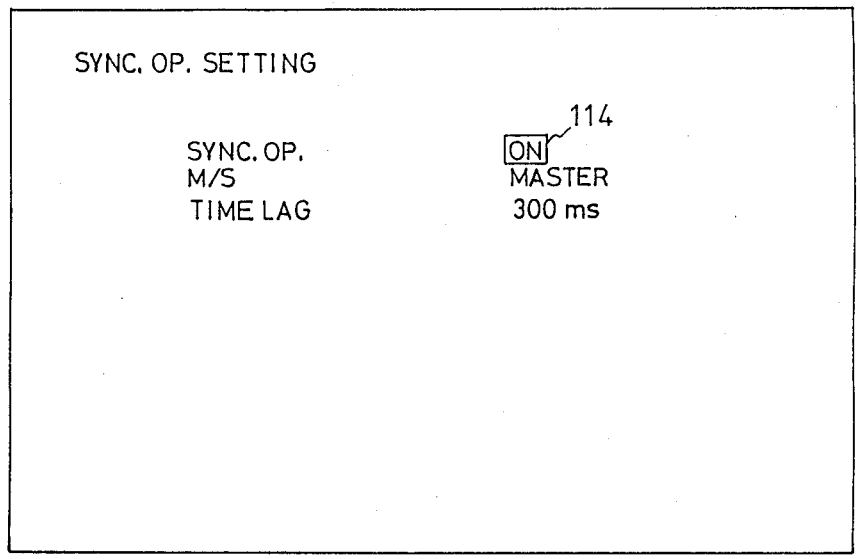

In case of changing the mode of operation from synchronized to nonsynchronized one or vise versa, the cursor 114 is moved to "SYNC" (steps S26, S28 and S29) and the run key 64 is pushed (step S38). Then, a synchronized operation setting pattern as shown in FIG. 14 is displayed (step S44). In this pattern, the indication "SYNC ON" means that the operation is now in synchronized mode, the indication "M/S MASTER" means that the combination weigher 12a executes the master or discharge routine of FIG. 6 and the indication "TIME LAG 300 ms" means that T2 of the discharge routine of FIG. 6 is 300 milliseconds. When nonsynchronized mode of operation is requested, the cursor 114 is moved to "ON" and the plus key 78 is pushed to enter step S46 through steps S30 and S34. Step 46 determines whether the synchronized operation is now on or not. As the answer is YES in this case, it is turned off (step S48). If NO, it is turned on (step S50). For example, it is requested to change the master/slave selection in case of synchronized mode, the cursor is moved to the indication of "M/S" (it is MASTER in FIG. 14) and the plus key 78 is pushed. Then, it is inquired whether the master routine is running or not (step S52) and, if YES, it is changed into the slave routine (step S54). Thus, the combination weigher 12a is ready for execution of the discharge routine of FIG. 7. On the other hand, if the answer in step S52 is NO, it is changed into the master routine (step S56). If it is requested to change the value of time lag when the synchronized operation is running and the combination weigher 12a is executing the master routine, the cursor 114 is moved to the value of time lag (300 ms in FIG. 14) and the plus and minus keys 78 and 80 are pushed. Then, the value of time lag is modified in response to operation of these keys (step S58). Thus, the time lag can be modified into a desired value in this manner.

Figure 15:
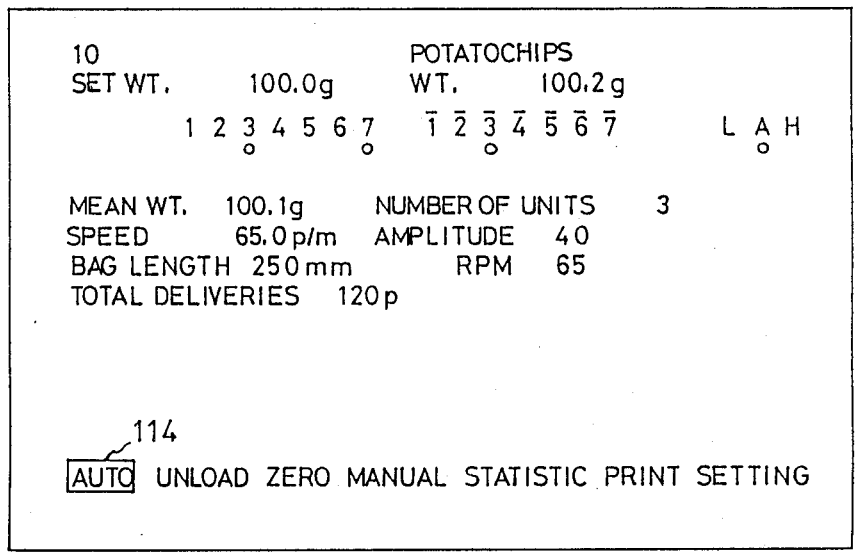

Upon completion of the above-mentioned setting operation, the operator pushes the return key 66 to display the original pattern as shown in FIG. 12 (step S60). If the operator then moves the cursor 114 to AUTO and pushes the run key 64 (step S38), step S62 determines whether the operation is automatic or not. As the operation is not yet automatic in this case, the answer is NO and the operating conditions set and stored in the operating condition table memory 108 as described above are supplied to the operating condition memories 54 in the weigher and packer control units 48a and 50a (step S64). Then, the combination weigher 12a and packer 14a are supplied with operation codes to their control units 48a and 50a to start operation (step S66). The displayed pattern now changes into a pattern as shown in FIG. 15, in which the cursor 114 is on AUTO and current operation data such as actual total weight, mean weight, number of combined hoppers, driving speed and total deliveries are displayed in addition to the preset essential operating conditions. In the pattern of FIG. 15, small circles under the numerals "3", "7" and "3" indicate that the third and seventh weigh hoppers and the third auxiliary hopper have made a combination just unloaded and another small circle under the symbol "A" indicates that the actual total weight 100.2 grams of this combination is acceptable. When the small circle appears under the symbol "L" or "H", it indicates that the total weight is unacceptably low or high.

When the operator pushes the run key 66 again in this state, the answer in step S62 becomes YES and an operation stop code is supplied (step 68) to stop the weigher 12a and the packer 14a.

Although, in the above embodiment, discrete microcomputers are used in the respective control units and the operation display unit, some of all of these microcomputers may be united into single higher class microcomputer. The combination weigher and the associated packer may be controlled by a control system as disclosed in the Japanese opened pat. gazette No. 62-103524.

Figure 17:
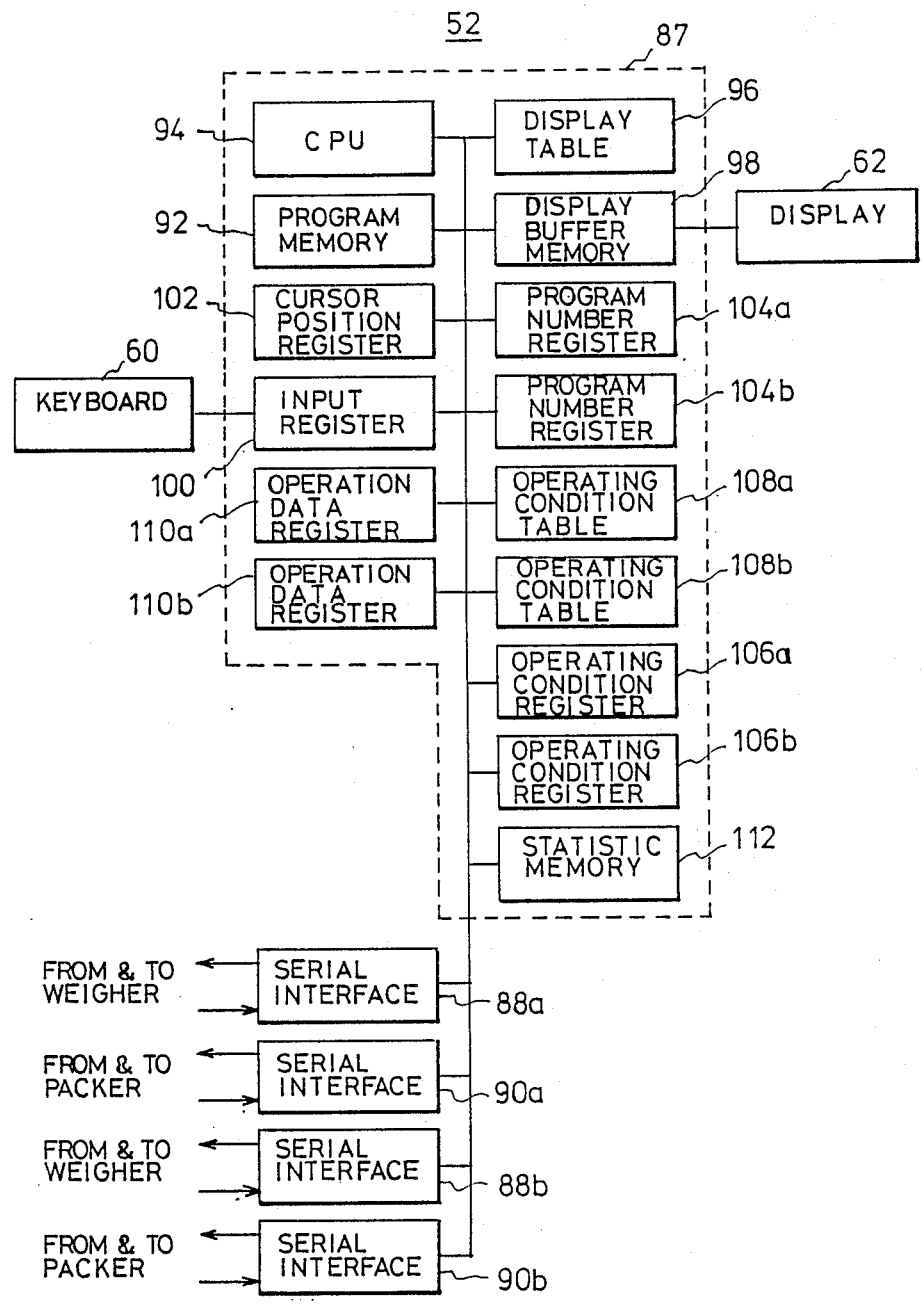
FIG. 17 is a block diagram representing the operation display means of the embodiment of FIG. 16.
Figure 18:
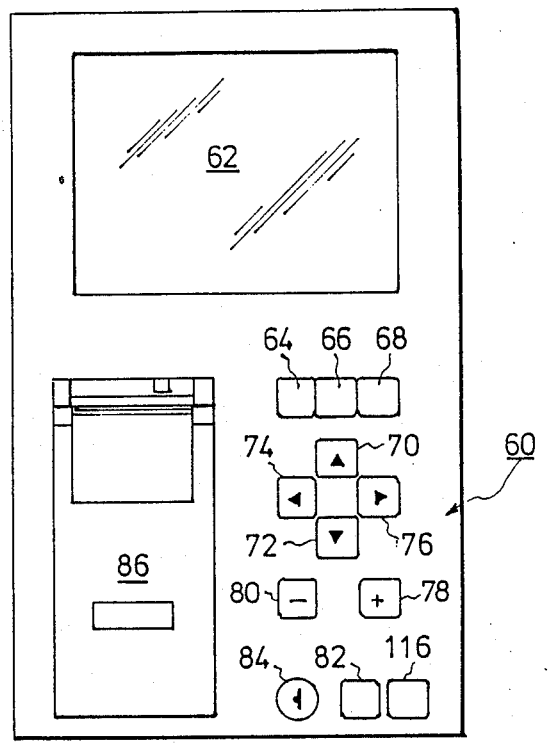
FIG. 18 is a front view representing an external appearance of operation display means of the embodiment of FIG. 16.

A second embodiment is shown in FIGS. 16 to 19. As understood from FIG. 16, this embodiment is substantially same in structure as the first embodiment except that a single operation and display unit 52 is used. As shown in FIG. 17, a microcomputer 87 included in the operation display unit 52 includes pairs of program number registers 104a and 104b, operating condition registers 106a and 106b, operating data registers 110a and 110b in contrast to the microcomputer 87 of operation display unit 52a of FIG. 9. This enables the single operation display unit 52 to set and supply operating conditions and to display operation data for both the series (series A) of combination weigher 12a and packer 14a and the series (series B) of combination weigher 12b and packer 14b. For this purpose, four serial interfaces 88a, 88b, 90a and 90b are used. In order to select one of these series for operation and display, a selection switch 116 is added to the keyboard 60 as shown in FIG. 18.

Figure 19:
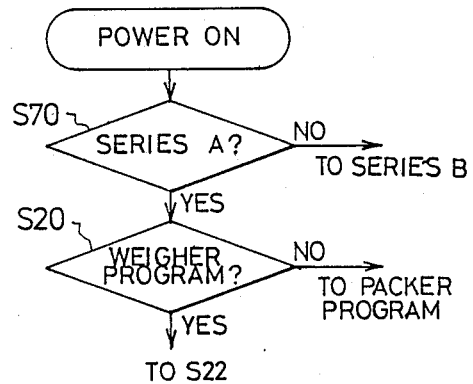
FIG. 19 is a schematic flow chart repesenting the operation of the embodiment of FIG. 16.

The program memory 92 stores two programs for operating the series A and B, respectively, as shown in FIG. 11. When the power is put on, as shown in FIG. 19, step S70 determines, whether the series A has been selected by the selection switch 116. If YES, step S20 and on for the series A are executed as described above and, if NO, these steps for the series B are executed similarly.

The second embodiment using a single operation display unit enables reduction of the device size as compared with the first embodiment. In the second embodiment, the selection switch 116 must be turned to the series B if one wants to see the operation data of the series B when the operation data of the series A are displayed. However, the display unit may be arranged to display the operation data of both series A and B at the same time. While, in the above-described embodiments, the combination weighers 12a and 12b have auxiliary hoppers, prior art combination weighers of the type having no auxiliary hopper may be substituted therefor.

We claim:

1. A weighing and packing device comprising:
   first and second combination weighers, each adapted to deliver batches of product, each batch having a total weight substantially equal to a target weight preset as an operating condition of each said weigher;
   first and second packers adapted to pack said batches of product delivered from said first and second combination weighers, respectively;
   control means for controlling operation of said first and second combination weighers and said first and second packers;
   at least one operation display means coupled to said control means for supplying operating conditions of said first and second combination weighers and said first and second packers and displaying operation data of said first and second combination weighers and said first and second packers;
   said control means adapted to operate said first and second combination weighers in a first mode in which said weighers operate synchronously to deliver said batches of product to their respective packers in first and second cycles, respectively, one cycle being a function of the other, and in a second mode in which said weighers operate nonsynchronously to deliver said batches of product to their respective packers in first and second cycles, respectively, which are independent of each other; and
   said control means includes means for selecting one of said first and second modes of operation in accordance with said operating conditions supplied from said operation display means.

2. A weighing and packing device, as set forth in claim 1, wherein said first mode of operation includes substantially simultaneous delivery of said batches of product by said first and second combination weighers to their respective packers, and further includes time lag delivery of said batches of product by said first and second combination weighers to their respective packers such that each combination weigher delivers its product a predetermined time after the other combination weigher delivers its product, and wherein said control means is adapted to selectively execute said simultaneous delivery operation or said time lag delivery operation in response to said operating conditions supplied from said operation display means.

3. A weighing and packing device, as set forth in claim 1 or 2, wherein said control means includes first and second combination weigher control units for respectively controlling operation of said first and second combination weighers, and first and second packer control units for respectively controlling operation of said first and second packers.

4. A weighing and packing device, as set forth in claim 3, wherein said control units are contained in a single housing.

5. A weighing and packing device, as set forth in claim 4, wherein said operation display means is a single unit.

6. A weighing and packing device, as set forth in claim 4, wherein said operation display means is formed as two units.

7. A weighing and packing device, as set forth in claim 3, wherein said operation display means is a single unit.

8. A weighing and packing device, as set forth in claim 3, wherein said operation display means is formed as two units.

9. A weighing and packing device, as set forth in claim 1 or 2, wherein said control means includes a first combination weigher packer control unit for controlling operation of said first combination weigher and said first packer, and a second combination weigher packer control unit for controlling operation of said second combination weigher and said second packer.

10. A weighing and packing device, as set forth in claim 9, wherein said control units are contained in a single housing.

11. A weighing and packing device, as set forth in claim 10, wherein said operation display means is a single unit.

12. A weighing and packing device, as set forth in claim 10, wherein said operation display means is formed as two units.

13. A weighing and packing device, as set forth in claim 9, wherein said operation display means is a single unit.

14. A weighing and packing device, as set forth in claim 4, said operation display means is formed as two units.

15. A weighing and packing device, as set forth in claim 1 or 2, wherein said operation display means is a single unit.

16. A weighing and packing device, as set forth in claim 1 or 2, wherein said operation display means is formed as two units.

17. A weighing and packing method for use with first and second combination weighers, each adapted to deliver batches of product, each batch having a total weight substantially equal to a target weight preset as an operating condition of each said weigher; first and second packers adapted to pack said batches of product delivered from first and second combination weighers, respectively; and at least one operation display means for supplying operating conditions of said first and second combination weighers and said first and second packers and displaying operation data of said first and second combination weighers and said first and second packers; said method comprising the steps of:
   operating said first and second combination weighers in a first mode in which said weighers operate synchronously to deliver said batches of product to their respective packers at first and second cycles, respectively, one cycle being a function of the other, and in a second mode in which said weighers operate nonsynchronously to deliver said batches of product to their respective packers at first and second cycles, respectively, which are independent of each other; and selecting one of said first and second modes of operation in accordance with said operating conditions supplied from said operation display means.

18. A weighing and packing method as set forth in claim 17 wherein said first mode of operation includes the steps of substantially simultaneously delivering said batches of product by said first and second combination weighers to their respective packers and time lag delivering said batches of product by said first and second combination weighers to their respective packers such that each combination weigher delivers its product a predetermined time after the other combination weigher delivers its product; and wherein said selecting step comprises the step of selectively executing said simultaneous delivery operation or said time lag delivery operation in response to operating conditions supplied from said operation display means.

* * * * *

UNITED STATES PATENT AND TRADEMARK OFFICE
CERTIFICATE OF CORRECTION

PATENT NO. : 4,840,240
DATED : June 20, 1989
INVENTOR(S) : Yoshiharu Toyoda, Yoshitaka Mikata, Shoji Yamano It is certified that error appears in the above-identified patent and that said Letters Patent is hereby corrected as shown below:

Column 1, line 10, "to twin-type combination" should read --to "twin-type" combination--.

Column 1, line 42, "modes which" should read --modes, and which--.

Column 1, lines 50/51, "of each aid weigher" should read --of each said weigher--.

Column 1, line 51, "weigher first" should read --weigher. First--.

Column 1, line 53, "respectively control" should read --respectively. Control--.

Column 2, line 53, "chart repesenting the" should read --chart representing the--.

Column 3, line 59, "common suppor base" should read --common support base--.

Column 4, line 3, "from a sheel material" should read --from a sheet material--.

Column 5, line 43, "In he discharge" should read --In the discharge--.

UNITED STATES PATENT AND TRADEMARK OFFICE
CERTIFICATE OF CORRECTION

PATENT NO. : 4,840,240
DATED : June 20, 1989
INVENTOR(S) : Yoshiharu Toyoda, Yoshitaka Mikata, Shoji Yamano It is certified that error appears in the above-identified patent and that said Letters Patent is hereby corrected as shown below:

Column 6, line 44, "when on CPU" should read --when one CPU--; line 61, "58, various" should read --58. Various--.

Column 7, line 21, "operation didplay unit" should read --operation display unit--; line 57, "a progfram memory" should read --a program memory--.

Column 9, line 3, "case step" should read --case, step--.

Column 10, line 50, "operating data" should read --............--.

Column 12, claim 14, line 37, "claim 4, said" should read --claim 9, wherein said--.

Signed and Sealed this

Eleventh Day of September, 1990

*Attest:*

HARRY F. MANBECK, JR.

*Attesting Officer*      *Commissioner of Patents and Trademarks*